Figure 2:
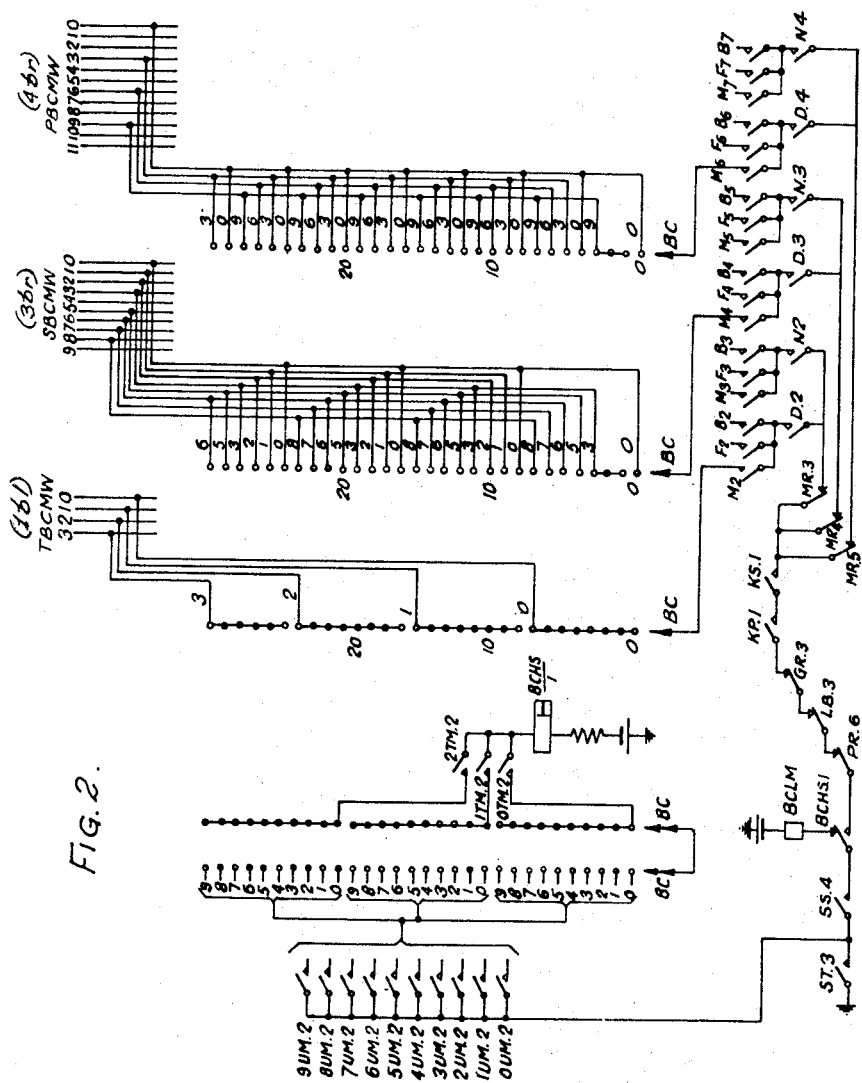

Sept. 29, 1953     J. A. LAWRENCE ET AL     2,653,761
ELECTROMECHANICAL CALCULATING MACHINE
Filed Feb. 24, 1948     7 Sheets-Sheet 1

FIG. 1.

John Albert Lawrence
Kenneth Malcolm Heron
By Hall & Houghton
attorneys

Patented Sept. 29, 1953

2,653,761

UNITED STATES PATENT OFFICE 2,653,761

ELECTROMECHANICAL CALCULATING MACHINE

John Albert Lawrence and Kenneth Malcolm Heron, London, England

Application February 24, 1948, Serial No. 10,228
In Great Britain February 26, 1947

5 Claims. (Cl. 235—61)

This invention relates to electromechanical calculating machines for deriving an amount in accordance with at least two variables fed to the machine. The amount referred to may be a number which is related to the variables according to a non-continuous function and it may be an amount representing a sum of money. The machine may be provided with an accumulator which adds the amounts calculated into a grand total.

The variables may each have one of several values which is converted into an electrical signal, referred to herein as a mark and these signals are then fed to the machine. The term "mark" includes any predetermined electrical condition such as may be obtained, for example, by a connection to a battery, earth or a source of alternating current. The values of the variables may be represented by appropriately positioned holes punched in a card or they may be indicated by means of manually operated keys.

The machine is normally fitted with indicating means to show the result of the calculation and where a permanent record is required suitable printing mechanism may also be incorporated.

Where the amount to be derived is dependent upon a combination of several variables it may be convenient to effect the calculation in, for example, two stages. In one of these stages an amount dependent on a first set of the variables is derived and is then added, in the other stage, to a second amount derived in dependence upon the remaining variables or these latter in conjunction with one or more of the first set of variables.

The addition may be performed by a rectangular coordinate array of contacts of a form known in the art. The contacts are those of a single motion switch, the position of which is determined by a first set of variables, the contact or wiper arms of the switch being marked in accordance with the remaining variables or in accordance with a combination thereof with some or all of the first set of variables.

The expression "rectangular coordinate network" as used herein means a network in which the contacts are capable of being represented graphically as points each having integral coordinates with respect to a pair of perpendicular axes. It will be understood that the term "line" as used herein with reference to the coordinate switching system means an imaginary line.

Counting systems in use at present are based on the principle that an arbitrary number of the units to be counted is denoted by a larger unit, an arbitrary number of these larger units is denoted by a still larger unit, and so on. For the purpose of clarity, the smallest unit of any given system is referred to herein as a "first-order unit" the next larger unit as a "second-order unit" and so on, and the number of first-order units which go to make up a second order unit is referred to herein as a "first-order radix" the number of second-order units which go to make up a third-order unit as a "second-order radix" and so on. The first order radix is also referred to herein as "the radix of the first-order unit," the second-order radix as "the radix of the second-order unit" and so on. It will be understood that the various radices of a system may be the same or different. Thus, for example, in the decimal system the first-order unit is the digit, the second-order unit is ten, the third-order unit is one hundred and so on, and all the radices have the value 10. On the other hand, in the British monetary system the first-order unit is the penny, the second-order unit is the shilling, the third-order unit is the pound sterling, the fourth-order unit is 10 pounds sterling and so on, so that the first-order radix is 12, the second-order radix is 20 and the third-order and succeeding radices are 10.

The invention may advantageously be applied to the computation of the charges for trunk telephone calls. Such charges are made up of a basic charge dependent upon the time and distance of the call and an additional charge made up of a number of items of limited range. The machine can be used both to find the sum of the basic and additional charges for any particular call, and also to totalise the charges for a succession of calls. The basic charge, which is a function of at least two variables, is computed by means of a single motion switch such as a uniselector having a plurality of arcs, the wipers being moved to a position corresponding with one of the variables, whereupon a wiper corresponding with the other variable is marked, the contacts of the uniselector being so connected that this operation effects the required computation.

It will be understood that the adding machine of the invention can very easily be adapted from any counting system to any other by incorporating a switchboard, so that in order to change from one counting system to another it is only necessary to effect a switching operation.

Figure 4:
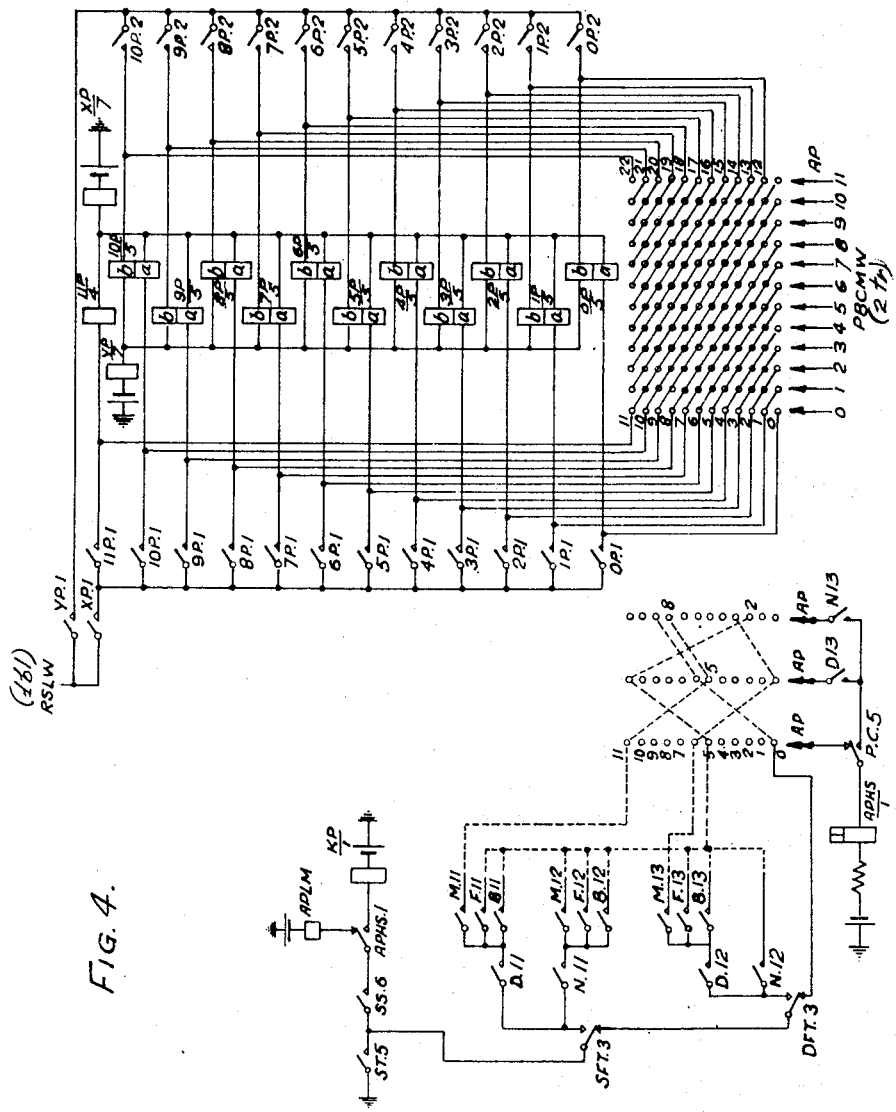
Figure 5:
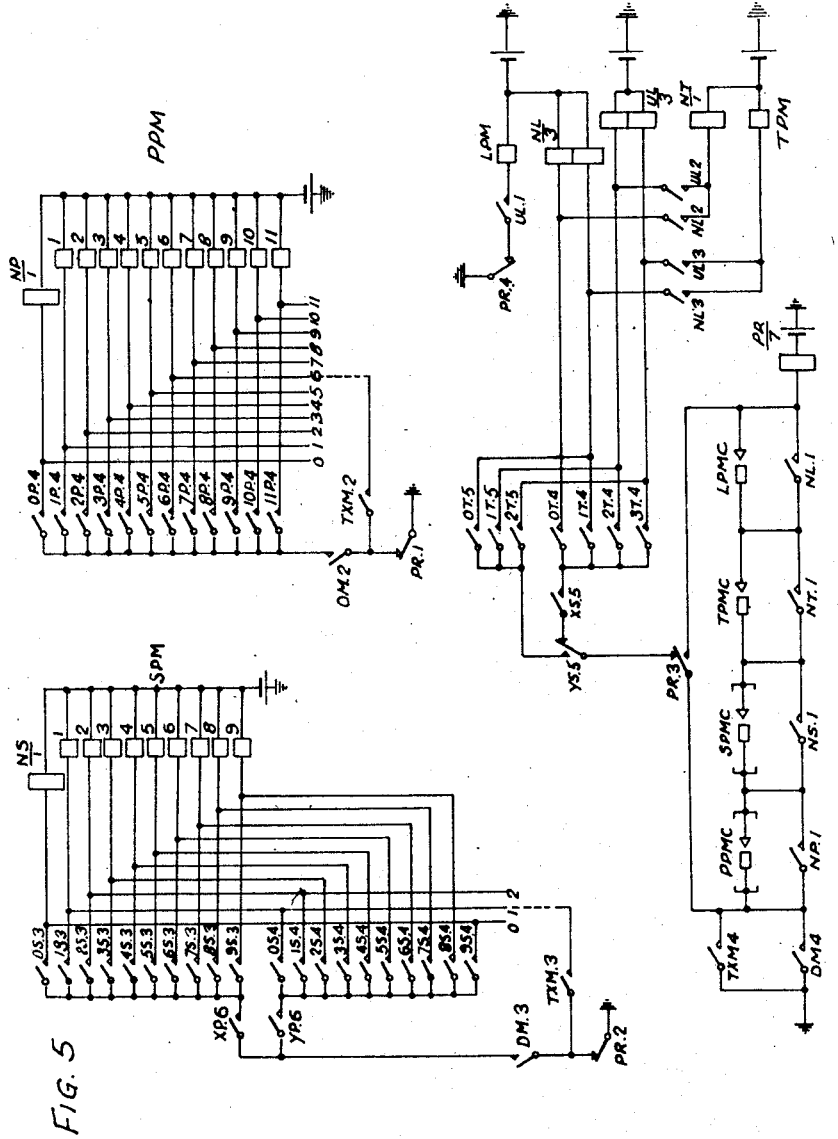
Figure 6:
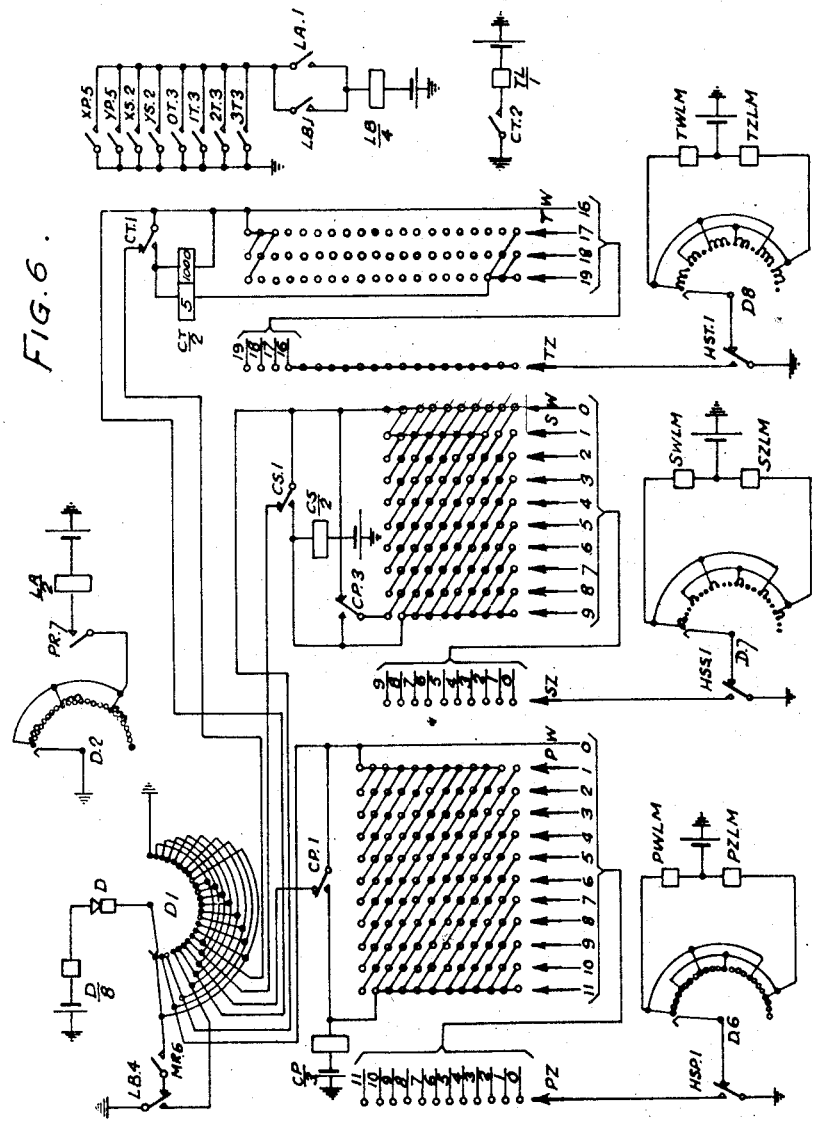
Figure 7:
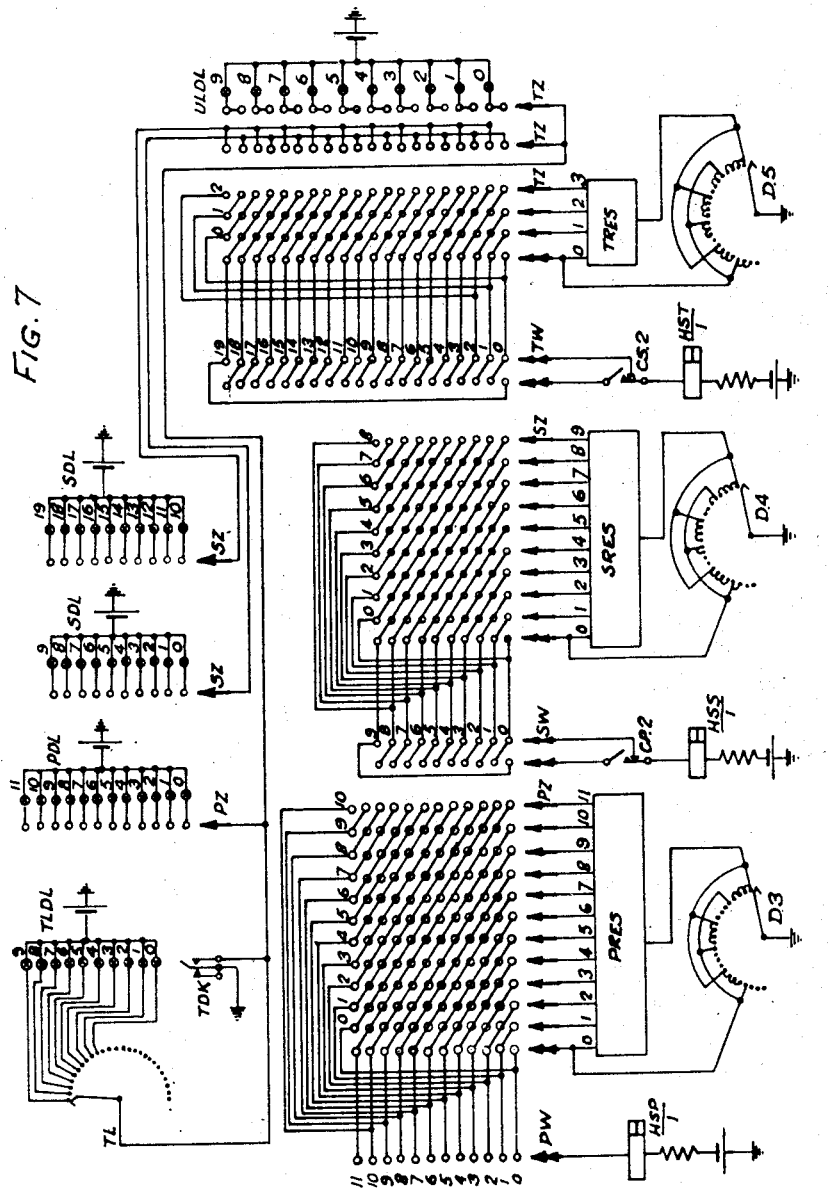

The invention is illustrated by way of example by the accompanying drawings, in which:

Figs. 1–5 are a circuit diagram of an electromechanical calculating machine adapted to compute the charges for trunk telephone calls, and Figs. 6 and 7 are a circuit diagram of an accumulator for totalising the successive charges computed by the machine described with reference to Figs. 1–5.

Conventions and omissions

In the drawings the standard convention for indicating the number of sets of contacts belonging to each relay and of identifying each set of contacts has been used, and all contacts are shown in the normal position, that is, the position occupied when the relay is not energised. Thus, for example $$\frac{\text{"ST"}}{5}$$

means that the relay ST has 5 sets of contacts which are denoted by ST.1, ST.2 etc. In order to facilitate reading of the drawings, the positions of relays, relay contacts, and other parts are in some cases indicated in the following description by a number indicating the number of the figure in which they appear followed by the letters $tl$, $tr$, $bl$ or $br$, indicating that the part in question is in the top left, top right, bottom left or bottom right quarter of the figure. This indication is placed in parentheses after the reference of the part in question. Thus, for example, ST.2 would be followed by ($lbr$) and ST.3 by ($2bl$).

While the drawings show the elements necessary to produce a workable machine, a number of parts which would normally be provided in practice have, for the sake of clarity, been omitted. Such parts are, for example, means for preventing false operation of the accumulator in the event of power failure, means for rejecting a faulty card, and the like. Circuits for carrying out these functions can readily be adapted from circuits well known in the art, and a description of them is not necessary for understanding the invention.

General description

Referring now to the diagram shown in Figs. 1–5 the data which are required to compute the charge for any particular trunk call are recorded in the form of holes punched in characteristic positions on a card which constitutes the record card for that call. The record cards are inserted successively in a machine of known kind which senses the holes and operates sense storage relays according the positions of the holes, and, when the computation for that card is complete, punches a further set of holes therein in positions characteristic of the result. This machine is referred to in the description relating to Figs. 1–6 as "the card machine."

In order to describe the calculating machine it is necessary to describe the data items which are recorded on the punch cards, used to determine the charges for trunk calls. These items can be classified as follows:

(a) Duration of the call in minutes, from 0–29 minutes.
(b) Charge letter B, E, F, G, H, K or M determined by the distance of the call.
(c) Period in which the call is made, day or night (referred to as D or N).
(d) Miscellaneous items which may or may not be present in any given call, namely—one of the items single fixed time additional charge and daily fixed time additional charge (referred to as SFT and DFT respectively); personal call (referred to as PC); transfer fee minimum (referred to as TX).

The basic charge for the call is a function of items (a), (b) and (c). To this basic charge there may be added an additional charge determined by one or more of the items (d) in combination with (b) and (c). In sensing the holes in the card, the card machine operates an appropriate selection of relays denoted in the case of items (b), (c) and (d) by the letters given above, and in the case of item (a) by 0UM, 1UM, 2UM ... 9UM for the unit minutes and 0TM, 1TM and 2TM for the tens of minutes, which relays control operating contacts bearing like reference symbols with added contact numbers.

After computation of the basic charge and the additional charge as described below, the two are added by means of Siemens motor-driven uniselectors AS (for the shillings) and AP (for the pence). The result is stored by result storage relays and, when the necessary checks have been completed, is caused to operate punch-setting magnets in the card machine. When this setting operation is complete the card machine records the result on the record card by punching holes in characteristic positions.

Charge computation

The cycle of operations will now be described in detail. In order to start the cycle, a locking start key having three sets of contacts S.1($1bl$), S.2($1br$) and S.3($1bl$) is operated. S.3 operates relay ST($1bl$), whereupon ST.1($1bl$) operates the card machine clutch magnet CM which causes the card machine to run for one cycle. During its cycle of operation, the card machine advances a newly inserted record card into position for sensing, advances the previously inserted card into the position for punching and ejects the card which has just been punched. The card machine now causes the sensing means to operate so as to close the appropriate selection of sense contacts S($1br$), of which only one is shown. The operated sense contacts operate their associated sense-storage relays, of which only DFT is shown. Each sense storage relay has a number of contacts, and the first contact of each relay, of which first contacts only DFT.1 is shown, locks its relay. The remainder of the contacts of the sense storage relays are shown, except those of relays E, G, H and K, which have been omitted for the sake of clarity. It will be understood that since the number of contacts required for the charge-letter and period sense storage relays exceeds the number available in relays of standard design, the relays in question may be supplemented by auxiliary relays to give the required number of contacts. The combination of relay and auxiliary relay acts as a single relay and is referred to herein as such.

When the sensing operation is complete, the card machine operates guard contacts GC, which then operate relay GR so as to disconnect the clutch magnet CM by means of contacts GR.1.

A sense check relay SK is connected with the parallelled first contacts of the sense storage relays belonging to one of the items (a), (b) or (c) described above. The contacts SK.1 of the three sense check relays are connected in series with one another and with a relay SS, so that when the three sense check relays have operated relay SS operates and is locked by SS.1($1br$). Thereupon, as soon as relay MR($1tl$) is released on completion of the previous calculation (see below), SS.3 operates relay SSA. Furthermore, contacts SS.4, SS.5 and SS.6 start operation of the Siemens motor-driven uniselectors BC (Fig. 2), AS (Fig. 3) and AP (Fig. 4) by connecting their latch magnets to earth through the operated contacts ST.3, ST.4 and ST.5 respectively. In the drawings the convention has been adopted of denoting all the wipers of a switch by the letters designating that switch. These letters are also used to denote the latch magnet and high-speed relay of that switch, the letters LM and HS, respectively, being added. The contacts of the switch are denoted by an array of small circles. The searching wipers of all the switches are bridging wipers and are denoted by double arrow heads.

The switch BC (Fig. 2) runs to a position, determined by which of the contacts 0UM2–9UM2 and 0TM2–2TM2 are operated, which is characteristic of the duration of the call, whereupon relay BCHS operates and stops the switch. The switch has two sets of three arcs associated with each of the charge letters B, E, F, G, H, K and M, one set being associated with the period D and the other with the period N. One of the arcs in each set is used for marking ten shillings, another for marking shillings and the third for marking pence. For the sake of clarity only the set of arcs associated with charge letter M and period D is shown in the drawings. The contacts of the ten shillings arcs are connected with a common set of ten shillings basic charging marking wires TBCMW, those of the shillings arcs with a common set of shillings basic charge markings wires SBCMW, and those of the pence arcs with a common set of pence basic charge marking wires PBCMW, the connections being such that if any set of three wipers in marked, the mark will be passed to those of the basic charge marking wires which correspond with the charge appropriate to the position of the switch (determined by the duration of the call) and the marked wipers (determined by the charge-letter and period of the call). The switch BC has thus prepared a circuit for marking the basic charge marking wires with the basic charge for the call. It will be understood that the connections of the switch contacts are selected to correspond with the charges for the time being in force, those shown in Fig. 2 merely being typical.

Figure 3:
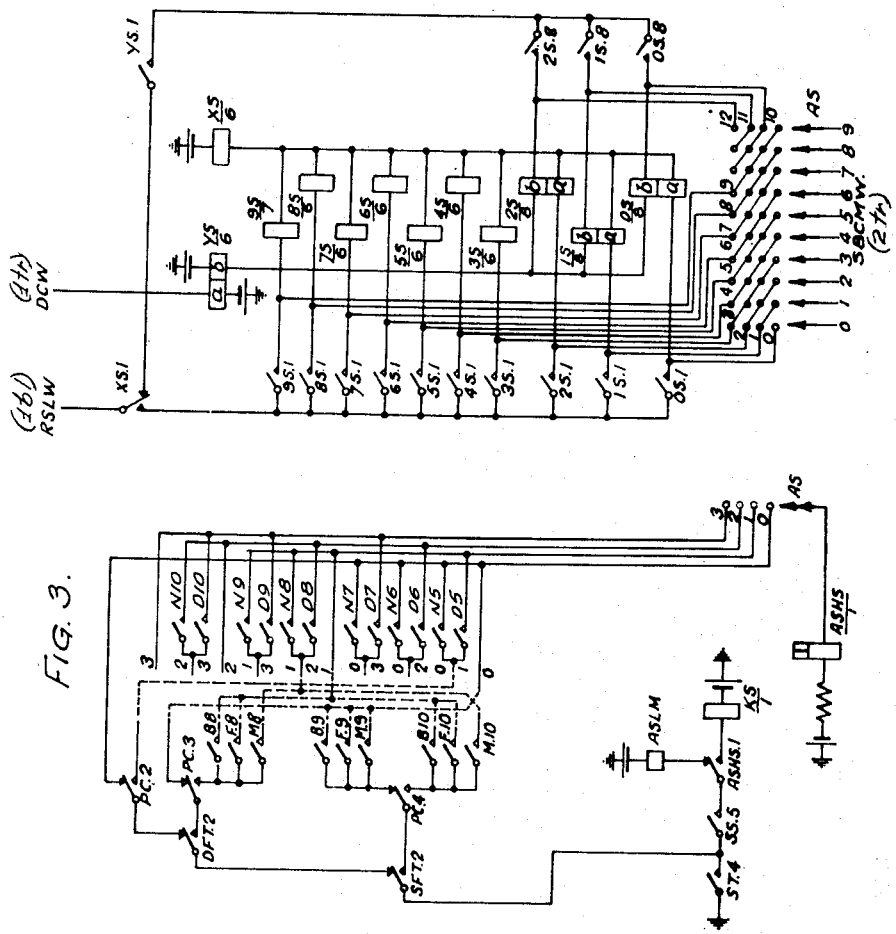

The switch AS (Fig. 3) runs to a position determined by which charge-letter and period sense-storage relays and which, if any, of the miscellaneous sense-storage relays DFT, SFT and/or PC have operated, whereupon relay ASHS operates and stops the switch. It will be seen from Fig. 3 that the sense storage relay contacts and the switch contacts are connected by means of a cross-connection field, the dotted lines representing flexible connections. The latter are selected, in accordance with the charges for the time being in force, so that the contact in the left-hand arc (as seen in Fig. 3) which is marked (through operated contacts ST.4) corresponds with the shillings value of the additional charge. The connections shown in Fig. 3 are merely typical. Only 4 positions of the switch AS have been provided, since the additional charge in no case exceeds three shillings and elevenpence.

The switch AP (Fig. 4) also runs to a position determined by which charge-letter and period sense-storage relays and which, if any, of the miscellaneous sense-storage relays DFT, SFT and/or PC have operated, whereupon relay APHS operates and stops the switch. The sense storage relay contacts and the switch contacts are connected by means of a cross-connection field in such a manner that the position to which the switch runs corresponds with the pence value of the additional charge under current regulations, the connections shown in Fig. 4 merely being typical.

The wipers of switch AS marked 0–9 in Fig. 3 are connected with the basic charge marking wires SBCMW.0–9. The contacts of the switch AS form a coordinate system and are connected together in sets satisfying, respectively, the equations $$y+x=0$$
$$y+x=1$$
$$\cdot \cdot$$
$$\cdot \cdot$$
$$\cdot \cdot$$
$$y+x=n-1$$
$$y+x=n$$
$$y+x=n+1$$
$$y+x=n+2$$

where $n$ is the radix of the second-order unit of the counting system used. This system is a modified British monetary system in which the first-order unit is the penny, the second-order unit is the shilling and the third-order unit is ten shillings. This system has been adopted for convenience, owing to the fact that the charge for any one call is in all cases less than 40 shillings. In the case of switch AS, therefore $n$ is equal to 10. The sets of contacts $[y+x=0]-[y+x=n-1]$ of the switch AS are connected, as shown in Fig. 3, with result storage relays 3S–9S and $a$ winding of result storage relays 0S–2S, and the sets of contacts $[y+x=n]-[y+x=n+2]$ are connected with $b$ windings of relays 0S–2S. The relays 3S–9S and $a$ windings of relays 0S–2S are also connected, as shown, with no-carry relay XS, and $b$ windings of relays 0S–2S are connected with $b$ winding of carry relay YS.

Likewise the wipers of the switch AP marked 0–11 in Fig. 4 are connected with the wires PBCMW0–11, and the contacts of the switch are connected together in sets satisfying, respectively, the equations $$y+x=0$$
$$\cdot \cdot$$
$$\cdot \cdot$$
$$y+x=n-1$$
$$y+x=n$$
$$\cdot \cdot$$
$$\cdot \cdot$$
$$y+x=2(n-1)$$

the value of $n$ in this case being 12 since there are 12 pennies in a shilling. The sets of contacts $[y+x=0]-[y+x=n-2]$ of the switch AP are connected, as shown in Fig. 4, with $a$ windings of result storage relays 0P–10P, the set of contacts $[y+x=n-1]$ is connected with result storage relay 11P, and the sets of contacts $[y+x=n]-[y-x=2(n-1)]$ are connected with $b$ windings of result storage relays 0P–10P. The relay 11P and the $a$ windings of relays 0P–10P are also connected, as shown, with no-carry relay XP, and the $b$ windings of relays 0P–10P are connected with carry relay YP.

The ten shillings basic charge marking wires TBCMW are connected directly with result storage relays 0T–3T(1b1).

When the switches BC, AS and AP have come to rest, their appropriate wipers are marked through a circuit comprising a chain of contacts of relays ST, SS, BCHS, PR, LB, GR, KP, KS and MR.(2*bl*). Of these ST, SS, BCHS and GR have already been described. In the case of GR the marking circuit is through the non-operated contacts GR.3, relay GR having been released by the opening of the contacts GC of the card machine after the sensing operation has been completed. Relay KP is operated by APHS.1 when switch AP comes to rest and relay KS is operated by ASHS.1 when switch AS comes to rest. Relays PR, LB and MR, which are described below, have not yet been operated in this cycle of operations.

*Result storage*

The mark applied to the appropriate wipers of the switch BC passes via the appropriate basic charge marking wires to the appropriate result storage relays, directly in the case of the ten shillings relays and via the appropriate wiper of the switch AS or AP in the case of the shillings and pence relays, so as to operate the relays.

Considering now the pence result storage relays, whichever one of these relays is operated one of the relays XP or YP will also be operated, XP if the pence result involves no carry to the shillings, YP if the result does involve a carry. The first contacts of the operated pence result storage relay and carry or no-carry relay serve to lock these relays through the result storage locking wire RSLW, contacts LA.2 or LB.2 (described below) and contacts S.1(1*bl*).

Likewise, whichever one of the shillings result storage locking relays is operated, one of the relays XS or YS (through the *b* winding) will also be operated, and the first or eighth contacts of the operated relays will lock them through the result storage locking wire. If, however, the shillings result is 9, so that 9S is operated, and the pence result involves a carry, so that YP is operated, not only does the relay XS operate, but the relay YS also operates through its *a* winding, the double carry wire DCW, contacts YP.4 and contacts 9S.7(1*tl*).

The first contact of whichever one of the tens of shillings result storage relays 0T–3T operates locks this relay through the contacts LB.2 or LA.2 and S.1(1*bl*).

*Transfer minima*

If the call is a transfer call, it is stipulated that a certain minimum charge, known as the transfer fee minimum, shall be made for the call. The record card for a transfer call has in it a hole in such a position that the transfer fee minimum sense-storage relay TX is operated when the card is sensed.

Referring now to the result control circuit shown at the top of Fig. 1, when any one of the relays 0T–3T, any one of the relays 0S–9S, any one of the relays 0P–11P, either of the relays XS or YS and either of the relays XP or YP, has operated a mark is passed either to the direct mark wire DMW or to the transfer mark wire TMW, according to whether the result is greater or less than the transfer fee minimum. The dotted lines in Fig. 1 denote flexible connections which can be varied according to the minimum charge for the time being in force. The connections shown in Fig. 1, which are merely typical, correspond with a minimum of one shilling and sixpence. If the result is greater than this minimum, or if the result is less and relay TX is not operated, relays DM and MR operate from the wire DMW. If on the other hand, the result is less than the minimum and relay TX has operated, relays TXM and MR operate from the wire TMW. Make-before-break contacts DM.1 guard the circuit for relay DM and make-before-break contacts TXM.1 guard the circuit for the relay TXM. These guards are necessitated by the fact that when relay MR operates, contacts MR.1(1*bl*) release relay ST, relay SSA being still operated. Contacts ST.2(1*br*) then release the sense storage relays, including TX if operated, and the next record card may be sensed before the current result has been recorded.

*Punch setting*

When either DM or TXM has operated, the appropriate shillings and pence punch-setting magnets SPM and PPM, or one or both of the relays NS, NP, are operated (see Fig. 5). It will be observed that if there is a carry from the pence to the shillings, contacts YP.6 cause the number of the shillings punch-setting magnet which is operated to exceed by one the number of the operated shillings result storage relay. The dotted connections in Fig. 5 are appropriate to a transfer fee minimum of one shilling and sixpence.

Likewise, when either DM or TXM has operated, one of the relays NL or UL(5*br*), which serve to convert the ten shillings result into pounds and ten shillings, operates. Relay NL operates if the ten shillings result is 0 or 1. If the result is 0, contacts NL.2 operate relay NT, and if the result is 1, contacts NL.3 operate the ten shillings punch-setting magnet TPM. Relay UL operates if the ten shillings result is 2 or 3, whereupon contacts UL.1 operate the pounds punch-setting magnet LPM. If the result is 2, contacts UL.2 operate relay NT, and if the result is 3, contacts UL.3 operate the ten shillings punch-setting magnet TPM. If there is a carry from the shillings to the ten shillings, contact YS.5 causes the operations described above for results 1, 2 and 3 to occur if result storage relays 0T, 1T and 2T respectively have operated. It will be observed that contacts YS.5 take precedence over contacts XS.5, so that if, owing to a double carry, both XS and YS have operated, only YS.5 is effective.

After the punch-setting magnets have been operated, the card machine punches holes in the appropriate position in the record card and thus records the result of the calculation.

Contacts PPMC, SPMC, TPMC and LPMC are operated by the punch-setting magnets PPM, SPM, TPM and LPM respectively when these are energised. When contact PPMC or relay NP, contact SPMC or relay NS, contact TPMC or relay NT, and contact LPMC or relay NL have operated, relay PR operates, whereupon contacts PR.1, PR.2, PR.3 and PR.4 release the punch-setting magnets, or the relays NP, NS, NT and NL, PR.3 serving also to lock PR. Contacts PR.6(2*bl*) serve to prevent premature operation of the result storage relays during the next cycle.

Reverting to the operation of relay MR(1*tl*), when this relay operates contacts MR.3, MR.4 and MR.5(2*bl*) disconnect separately the circuits for marking the pence, shillings and ten shillings result storage relays respectively so as to prevent feedbacks when switches BC, AP and AS move during the next calculation. As mentioned above, contacts MR.1(1*bl*) release relay ST, whereupon the sense storage relays and sense check relays SK(1*br*) are released by contacts ST.2, while contacts ST.3, ST.4 and ST.5 release relays BCHS, ASHS and KS, and APHS and KP respectively.

When relay SK releases, contacts SK.1(1br) release relay SS, whereupon contacts SS.3(1bl) release relay SSA, if, or when, relay PR has operated. When relay SSA releases, contacts SSA.1 re-operate relay ST and the cycle of events is repeated.

*Totalizing*

The results obtained by the calculating machine described above are totalised by the accumulator shown diagrammatically in Figs. 6 and 7. In these figures, PZ, SZ and TZ are Siemens motor-driven uniselectors for totalising the pence, shillings and ten shilling results respectively, and PW, SW and TW are Siemens motor-driven uniselectors which act as auxiliaries to the switches PZ, SZ and TZ, serving to mark the total up to the current calculation and to determine whether carries are involved. High-speed relay HSP(7bl) serves both switches PZ and PW, high-speed relay HSS serves both SZ and SW and high-speed relay HST serves both TZ and TW. D(6tl) associated with relay D/8 is a negative-drive ratchet switch (Post Office type uniselector) having 8 arcs of contacts D1 to D8 as hereinafter described, which is used to ensure a correct sequence of operations.

The contacts of the switches PZ and SZ(6bl) respectively form a coordinate system and are connected together in sets satisfying, respectively, the equations $$x+y=0$$
$$x+y=1$$
$$\cdot \quad \cdot$$
$$\cdot \quad \cdot$$
$$x+y=n$$
$$\cdot \quad \cdot$$
$$\cdot \quad \cdot$$
$$x+y=2(n-1)$$

In the case of PZ $n=12$ and in the case of SZ $n=10$. The sets of contacts are connected together as follows Set $x+y=0$ with set $x+y=n$
Set $x+y=1$ with set $x+y=n+1$
.        .
.        .
.        .
Set $x+y=n-2$ with set $x+y=2n-2$ The switch TZ is used for totalising the ten shillings unit, and for the sake of convenience the radix of this unit is taken as 20, so that the unit of next higher order is ten pounds. Since, however, no result to be totalised has more than 3 ten shillings, only 4 contacts are provided on the $x$— axis, corresponding with $x=0, 1, 2$ and 3. The contacts of the switch are connected together in sets satisfying, respectively, the equations $$x+y=0$$
.
.
.
$$x+y=n$$
$$x+y=n+1$$
$$x+y=n+2$$

$n$ in this case being equal to 20. The sets of contacts $x+y=20$, 21 and 22 respectively are connected with the sets $x+y=0$, 1 and 2.

The sequence of operations of the accumulator is started by the relay MR(1tl), operation of which indicates that calculation of the current result is complete, as described above. When relay MR operates, contacts MR.6(6tl) step switch D from outlet 1 to outlet 2. The switch D comprises 8 arcs having wipers denoted by D.1–D.8 respectively. When the switch steps to outlet 2, D.2 prepares for the operation of relay LA, as described below, D.3 marks that wiper of switch PZ which corresponds with the pence result, D.4 marks that wiper of switch SZ which corresponds with the shillings result and D.5 marks that wiper of switch TZ which corresponds with the ten shillings result. Furthermore D.6 operates the latch magnet PWLM of switch PW, D.7 operates the latch magnet SWLM of switch SW and D.8 operates the latch magnet TWLM of switch TW. The means for ensuring that the marks provided by wipers D.3, D.4 and D.5 respectively are applied to the correct wipers of switches PZ, SZ and TZ are not shown in the drawings but are indicated generally by blocks denoted by PRES, SRES and TRES, respectively. These means consist of a circuit arrangement analogous to that shown in Fig. 5 of contacts of relays DM., TXM. and 0P.–11P. in the case of the pence result, relays DM., TXM., XP., YP., 0S.–9S. and 0S.–9S. in the case of the shillings result, and relays XS, YS, and 0T–3T in the case of the ten shillings result, the contacts of relay PR being omitted in each case.

The operation of the switches will now be described with reference to the addition of a result $Tr_k$ ten shillings, $Sr_k$ shillings and $Pr_k$ pence to an existing total of $Tt_{k-1}$ ten shillings, $St_{k-1}$ shillings and $Pt_{k-1}$ pence. Owing to previous additions, the Z and W switches are standing at levels $y=Tt_{k-1}$, $St_{k-1}$ and $Pt_{k-1}$. When latch magnet PWLM is operated by D.6, switch PW runs until it reaches the position $Pt_{k-1}+Pr_k$, which is equal to the new total $Pt_k$, whereupon relay HSP operates and contacts HSP.1 stops the switch. Contacts HSP.1 simultaneously mark wiper $Pt_{k-1}$ of switch PW (or, if $Pt_{k-1}$ is zero, the wire marked 0) through the wiper of switch PZ shown in Fig. 6, the switch PZ being still at the position $Pt_{k-1}$. Owing to the connections of the contacts of switch PW as shown in Fig. 6, if the current addition does not involve a carry from the pence to the shillings, the mark is passed directly to switch D, which then steps to outlet 3. If, on the other hand, a carry is involved, relay CP operates and contacts CP.1 step switch D to outlet 3. This indicates that switch PW has been correctly positioned, and D.6 disconnects contacts HSP.1 from magnet PWLM.

The operation of switch SW is analogous to that of switch PW, except that if CP has operated, switch SW takes a further step owing to the operation of make-before-break contacts CP.2 and to the diagonally connected arcs of switch SW shown in Fig. 7. Furthermore, provision is made to distinguish between the case in which a total $St_k=St_{k-1}$ is arrived at owing to the addition of a result $r_k=0$, in which case no carry to the ten shillings is involved, and the case in which a total $St_k=St_{k-1}$ is arrived at owing to the addition of a result $r_k=n-1$ plus a carry from the pence total, in which case a carry to the ten shillings is involved. For this purpose contacts CP.3 are provided.

When switch SW has reached its correct position (including any carry from the pence), switch D steps to outlet 4, relay CS having operated if a carry to the ten shillings is involved.

As mentioned above, when switch D steps to outlet 2, D.2 prepares for the operation of relay LA. This occurs through contacts PR.7 when relay PR has operated, whereupon contacts LA.1(6tr) operate relay LB through any or all of contacts OT.3–3T.3, XP.5, YP.5, XS.5, and YS.2. Contacts LB.1 lock relay LB. Contacts LB.2(1bl) open, but the result storage relays are still held by the operated contacts LA.2(1bl). Contacts LB.3(2bl) prevent premature re-operation of the result storage relays, and contacts LB.4(6tl) step switch D to outlet 5, indicating that the relay PR and the punch-setting magnets or the relays NP, NS, NT and NL have correctly operated.

The operation of switch TW is analogous to that of switch SW, except that the circuit for operating relay CT is completed through outlet 5 of switch D, so that CT cannot operate before this outlet has been reached. The operating circuit for relay CT includes a 1000Ω winding of the relay, so that the operating current is insufficient to operate the drive magnet of switch D. Contacts CT.1, when operated, short-circuit this winding and switch D then steps to outlet 6 owing to the earth provided through the low resistance (5 ohm) winding of relay CT. This indicates that switch TW has been correctly positioned and, if required, relay CT has correctly operated.

When switch D steps to outlet 6, D.1 releases relay CT, and D.2 releases relay LA, whereupon contacts LA.2(1bl) release all the operated storage relays. D.3 releases relay HSP and marks wiper 0 of switch PZ, D.4 releases relay HSS and marks wiper 0 of switch SZ, and D.5 releases relay HST and marks wiper 0 of switch TZ. When these relays have been released, their contacts operate the latch magnets PZLM, SZLM and TZLM through wipers D.6, D.7 and D.8 respectively.

Switch PZ runs to the position P$t_k$, whereupon relay HSP re-operates and contacts HSP.1 stop the switch. Contacts HSP.1 also complete a circuit through the appropriate wiper and contacts of switch to PW to step switch D to outlet 7, whereupon D.3 releases relay HSP, and D.6 disconnects PZLM from contacts HSP.1.

Likewise switch SZ runs to the position S$t_k$ and switch D steps to outlet 8; and switch TZ runs to the position T$t_k$ and switch D steps to outlet 9.

Meanwhile, if relay CT had operated and released, contacts CT.2 would have advanced the negative-drive ratchet switch TL through one step.

The positions of the switches PZ, SZ, TZ and TL thus indicate the total $t_k$ in pence, shillings, ten shillings and ten pounds respectively. Wipers of switches PZ, TZ and TL are connected with a total display key TDK, and the corresponding arcs are connected with total display lamps PDL, SDL and ULDL, and TLDL, which indicate the totals in pence, shillings, unit pounds and ten pounds respectively. In the case of display lamps SDL, the connection with the arc of switch TZ is through two wipers of switch SZ. The connections with the display lamps SDL and ULDL are arranged as shown in Fig. 7 so as correctly to interpret the ten shillings result in terms of shillings unit pounds and ten pounds.

When switch D steps from outlet 5 to outlet 6, that is, when the addition has been completed on the W switches, the result storage relays are released as described above. Thereupon relays DM or TXM, MR and LB release. Contacts DM.4 release relay PR(5br) and contacts MR.2(1bl) permit relay SSA to operate when required to do so for the next calculation. Moreover contacts PR.6, LB.3 and MR.3, 4 and 5(2bl) prepare again for the operation of the result storage relays for the result of the next calculation.

When switch D steps from outlet 8 to outlet 9, that is, when the addition has been completed on the Z switches, a further cycle of operations can begin as soon as relay MR re-operates, outlet 9 being identical with outlet 1.

*Representative calculation*

Thus, in a typical calculation based on a personal call of five minutes' duration made during the day over a distance corresponding with the charge letter M, the following sense storage relays will operate:

(a) Relay 5UM of the relay set 0UM–9UM indicating the units value of the duration of the call and relay 0TM of the set 0TM–3TM indicating the tens value of the duration, in this case 0.

(b) Relay D corresponding with the period "day."

(c) Relay PC indicating that extra charges are to be made as the call is "personal."

A card punched to indicate these values of the variables is inserted into the sensing machine and the start key is operated. As above noted, the switch BC(2bl) has two sets of three arcs associated with each of the charge letters BEFGHK and M, one associated with the day period D, and the other with the night period N. By the card here assumed the relays M and D are selected and operated, and the switch BC (Fig. 2) is stopped in its sixth position which corresponds with the call duration of five minutes as indicated by the operated contacts 5UM2 and 0TM2 of relays 5UM and 0TM respectively.

The contacts of the operated relays D and M will complete a circuit to the three wipers of the switch BC which have been positioned on the sixth contact of their respective arcs. The marking signal will thus pass via contacts D2 and M2(2br), the first wiper of switch BC to the wire 0 of the wire group TBCMW; via contacts D3 and M4, the second wiper of switch BC to the wire 6 of the wire group SBCMW; and via contacts D4 and M6, the third wiper of switch BC to the wire 3 of the wire group PBCMW.

Simultaneously, the switch AS(3bl) will have moved into its second position where it will be stopped by the contacts PC2 and D5 of the operated relays PC and D. Contacts DFT2 and SFT2(3bl) of the corresponding relays of which DFT(1br) is representative will remain in the positions shown in Fig. 3.

Contacts PC5 and DI3(4bl) of the operated relays PC and D stop the switch AP (Fig. 4) in its seventh position indicating that there is an additional charge of sixpence to be added.

The mark appearing on wire 6 of the group SBCMW(2tr, 3br) will energise the relays 7S and XS(3tr) since the switch AS is in its second position; while the mark on wire 3 of the group PBCMW(2tr, 4br) will energise relays 9P and XP(4tr) since switch AP is in its seventh position. In addition, the mark on wire 0 of the wire group TBCMW(2tr, 1bl) will energise relay 0T(1bl).

Thus, relays DM and MR (Fig. 1) will be energised via the operated contacts XP4, XS3, XP2, OT2, XS4 and 7S2. Operated contacts DM3, XP6 and 7S3(5tl) cause punch magnet SPM7 to operate while punch magnet PPM9(5tr) will operate via contacts PR1, DM2 and 9P4, indicating that the total charge for the call is seven shillings and ninepence. The relay NL(5br) will be energised via contacts DM4, PR3, YS5, XS5 and OT4 and will in turn energise relay NT via contact NL2, these relays indicating that the total charge does not involve either ten shillings or pounds.

Finally relay PR(5br) operates via contacts DM4, PPMC, SPMC, NT1, NL1 and releases the punch setting magnets via contacts PR1(5tr) and PR2(5bl).

We claim:

1. An electromechanical calculating machine for determining an amount in dependence upon several variables each of which may have one of several values and which comprises in combination, a number of groups of electrical relays, each group characterising one of said variables, each relay in each group representing one of the possible values of the variable and each relay having at least one contact, a first single motion switch having a plurality of contacts arranged in first and second banks, first and second sets of contact arms, means for moving said first and second sets of contact arms in synchronism over said first and second banks respectively, electrical connections between the contacts in said first bank and the contacts of at least a first group of said groups of relays, further electrical connections between said second set of contact arms and the contacts of at least a second group of said groups of relays, means for selecting and energising one relay in each group, the movement of the contact arms of said first single motion switch being controlled by the energisation of the selected relay of said first group for the connection of an output circuit characteristic of variables represented by the selected relays of at least said first and second groups to a contact arm electrically connected to the selected relay of said second group, a second single motion switch having a plurality of contacts arranged in first and second banks, the contacts in said second bank of said second switch being electrically connected together in sets to form a rectangular coordinate network, first and second sets of contact arms for said second switch and means for moving the first and second sets of contact arms of said second switch in synchronism over said first and second banks of contacts respectively of said second switch, said output circuits being electrically connected to the second set of contact arms of said second switch and the contacts of the first bank of said second switch being electrically connected to the contacts of at least the remaining groups of said groups of relays, the movement of the contact arms of said second switch being controlled by the operation of the contacts of the selected relay or relays in said remaining groups for the connection of a final output circuit characteristic of the required amount to the contact arm connected to said output circuit.

2. An electromechanical calculating machine for determining an amount in dependence upon at least two variables each of which may have one of several values and which comprises in combination, a number of groups of electrical relays each group characterising one of said variables each relay in each group representing one of the possible values of the variable and each relay having at least one contact, a single motion switch having a plurality of contacts arranged in a first and second bank, first and second sets of contact arms, means for moving said first and second sets of contact arms in synchronism over said first and second banks respectively, electrical connections between the contacts in said first bank and the contacts of at least one group of said groups of relays, further electrical connections between said second set of contact arms and the contacts of at least one other group of said groups of relays, means for selecting and energising one relay in each group representing the value of each variable, the movement of said switch being controlled by the energisation of the relay or relays whose contacts are connected to the contacts of said first bank to connect output circuits each of which characterises a unit of a first amount to the contact arms connected to the energised relays of said further group, further single motion switches having their contacts electrically connected together to form coordinate arrays, sets of contact arms moving over the contacts of said further switches, and electrical connections between said output circuits and the set of contact arms of one of said further switches appropriate to the units of the said output circuit, means for moving said sets of contact arms of said further switches, the movement of said arms being controlled by the energisation of the remaining groups of relays to connect said output circuits to final circuits characterising the required amount in dependence upon all the variables.

3. An electromechanical calculating machine for determining an amount in dependence upon at least two variables each of which may have one of several values and which comprises in combination, a number of groups of electrical relays, each group characterising one of said variables each relay in each group representing one of the possible values of the variable and each relay having at least one contact, a single motion switch having a plurality of contacts arranged in a first and a second bank, first and second sets of contact arms, means for moving said first and second sets of contact arms in synchronism over said first and second banks respectively, electrical connections between the contacts in said first bank and the contacts of at least one group of said groups of relays, further electrical connections between said second set of contact arms and the contacts of at least one other group of said groups of relays, means for selecting and energising one relay in each group representing the value of each variable, the movement of said switch being controlled by the energisation of the relay or relays whose contacts are connected to the contacts of said first bank to connect output circuits each of which characterises a unit of a first amount to the contact arms of said second set which are connected to the contacts of the energised relays of said further group, further single motion switches each of which is appropriate to one unit of said first amount, a plurality of contacts for each of said further switches, said contacts being electrically connected together to form rectangular coordinate arrays, a set of contact arms moving over the contacts of each of said further switches and electrical connections between said output circuits and the set of contact arms of the one of said further switches appropriate to the units of said output circuit, means for moving the set of contact arms of each further switch, the movement of said sets of arms of each of said further switches being controlled by the energisation of the remaining groups of said groups of relays to connect said output circuits to final circuits each of which characterises one unit of the required amount, further electrical relays in each of said final circuits, and means controlled by said further electrical relays to indicate said required amount, carry relays electrically connected between said final output circuits and which operate to connect said indicating means to the next higher unit.

4. An electromechanical calculating machine for determining an amount in dependence upon several variables each of which may have one of several values and which comprises in combination, a number of groups of electrical relays, each group characterising one of said variables, each relay in each group representing one of the possible values of the variable and each relay having at least one contact, a first single motion switch having a plurality of contacts arranged in first and second banks, first and second sets of contact arms, means for moving said first and second sets of contact arms in synchronism over said first and second banks respectively, electrical connections between the contacts in said first bank and the contacts of at least a first group of said groups of relays, further electrical connections between said second set of contact arms and the contacts of at least a second group of said groups of relays, means for selecting and energising one relay in each group, the movement of the contact arms of said first single motion switch being controlled by the energisation of the selected relay of said first group for the connection of an output circuit characteristic of variables represented by the selected relays of at least said first and second groups to a contact arm electrically connected to the selected relay of said second group, a second single motion switch having a plurality of contacts arranged in first and second banks, the contacts in said second bank of said second switch being electrically connected together in sets to form a rectangular coordinate network, first and second sets of contact arms for said second switch and means for moving the first and second sets of contact arms of said second switch in synchronism over said first and second banks of contacts respectively of said second switch, said output circuits being electrically connected to the second set of contact arms of said second switch and the contacts of the first bank of said second switch being electrically connected to the contacts of at least the remaining groups of said groups of relays, the movement of the contact arms of said second switch being controlled by the operation of the contacts of the selected relay or relays in said remaining groups for the connection of a final output circuit characteristic of the required amount to the contact arm connected to said output circuit and which also comprises an accumulator for totalising the amounts determined.

5. An electromechanical calculating machine for determining an amount in dependence upon several variables each of which may have one of several values and which comprises in combination, a number of groups of electrical relays, each group characterising one of said variables, each relay in each group representing one of the possible values of the variable and each relay having at least one contact, a first single motion switch having a plurality of contacts arranged in first and second banks, the contacts of said second bank being arranged in a number of sections, each section representing one unit of said amount, first and second sets of contact arms, means for moving said first and second sets of contact arms in synchronism over said first and second banks respectively, each arm of said second set of arms moving over one section of said second bank of contacts, electrical connections between the contacts in said first bank and the contacts of at least a first group of said groups of relays, for their electrical connections between said second set of arms and the contacts of at least a second group of said groups of relays, means for selecting and energising one relay in each group, the movement of the contact arms of said first single motion switch being controlled by the energisation of the selected relay of said first group for the connection of output circuits each characteristic of one unit of a first amount representative of the selected relays of at least said first and second groups of relays to contact arms of said second set electrically connected to the selected relay of said second group, a further single motion switch for each unit of the said amount, each further switch having a plurality of contacts arranged in first and second banks, the contacts in said second bank of each further switch being electrically connected together in sets to form a rectangular co-ordinate network, first and second sets of contact arms for each further switch and means for moving the first and second sets of contact arms of each further switch in synchronism over said first and second banks respectively of each further switch, said output circuits being electrically connected respectively to the second set of contact arms of the further switch characteristic of the unit of the said first amount represented by the connected output circuit, and the contacts of the first bank of each further switch being electrically connected to the contacts of at least the remaining group of said groups of relays, final output circuits each including electrical relays each relay representing one value of each digit of the said amount and being electrically connected to one set of contacts of said second bank of contacts of each further switch and a carry relay for each final output circuit except that representing the highest unit of said amount, the movement of the contact arms of each further switch being controlled by the operation of the contacts of the selected relay or relays in said remaining groups for the connection of final output circuits containing relays representing the digits of said amount to the contact arms connected to said output circuits said carry relays being also connected to said contact arms when a carry is required to a next higher digit.

JOHN ALBERT LAWRENCE.
KENNETH MALCOLM HERON.

References Cited in the file of this patent

UNITED STATES PATENTS

| Number | Name | Date |
|---|---|---|
| 1,876,293 | Hofgaard | Sept. 6, 1932 |
| 1,876,294 | Hofgaard | Sept. 6, 1932 |
| 2,061,745 | Wadel | Nov. 24, 1936 |
| 2,099,754 | Robinson | Nov. 23, 1937 |
| 2,165,298 | Paris | July 11, 1939 |
| 2,305,779 | Hebel | Dec. 22, 1942 |
| 2,486,809 | Stibitz | Nov. 1, 1949 |

FOREIGN PATENTS

| Number | Country | Date |
|---|---|---|
| 450,015 | Great Britain | July 8, 1936 |
| 716,154 | Germany | Jan. 16, 1942 |